(12) United States Patent
Costa Perez et al.

(10) Patent No.: US 11,451,438 B2
(45) Date of Patent: *Sep. 20, 2022

(54) METHOD AND SYSTEM FOR CONFIGURING A USER EQUIPMENT

(71) Applicant: NEC CORPORATION, Tokyo (JP)

(72) Inventors: Xavier Costa Perez, Heidelberg (DE); Arnau Vives Guasch, Valls (ES)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/070,107

(22) Filed: Oct. 14, 2020

(65) Prior Publication Data
US 2021/0051063 A1    Feb. 18, 2021

Related U.S. Application Data

(63) Continuation of application No. 14/418,207, filed as application No. PCT/EP2013/066039 on Jul. 30, 2013, now Pat. No. 10,841,151.

(30) Foreign Application Priority Data

Jul. 30, 2012   (EP) .................................... 12178527

(51) Int. Cl.
| | | |
|---|---|---|
| G06F 15/177 | (2006.01) |
| H04L 41/0806 | (2022.01) |
| H04B 5/00 | (2006.01) |
| H04L 67/306 | (2022.01) |
| H04L 41/08 | (2022.01) |
| H04W 12/065 | (2021.01) |
| H04W 8/20 | (2009.01) |
| H04W 4/80 | (2018.01) |

(52) U.S. Cl.
CPC ....... *H04L 41/0806* (2013.01); *H04B 5/0031* (2013.01); *H04L 41/0883* (2013.01); *H04L 67/306* (2013.01); *H04W 12/065* (2021.01); *H04W 4/80* (2018.02); *H04W 8/20* (2013.01)

(58) Field of Classification Search
CPC ............. H04L 41/0806; H04L 41/0883; H04L 67/306; H04B 5/0031; H04W 12/065; H04W 4/80; H04W 8/20
See application file for complete search history.

(56) References Cited

U.S. PATENT DOCUMENTS

| | | | |
|---|---|---|---|
| 8,028,046 B2 | 9/2011 | Elliott et al. |
| 8,538,404 B2 | 9/2013 | Antani et al. |
| 10,841,151 B2 * | 11/2020 | Costa Perez | ......... H04B 5/0031 |

(Continued)

*Primary Examiner* — John B Walsh
(74) *Attorney, Agent, or Firm* — Sughrue Mion, PLLC (57) ABSTRACT

The invention relates to a method for configuring a user equipment, comprising the steps of a) accessing user related information, preferably account information, on the user equipment, b) transmitting the user related information to a dedicated configuration server, c) matching the user related information to a specific configuration information, d) upon matching, transmitting the configuration information to the user equipment, e) configuring the user equipment with the configuration information, and wherein initiation of the steps a)-e) is performed by a one-touch-client and wherein the configuration server is provided as a one-touch-server. The invention also relates to a system for configuring a user equipment.

12 Claims, 7 Drawing Sheets

(56) References Cited

U.S. PATENT DOCUMENTS

| | | |
|---|---|---|
| 2003/0172044 A1 | 9/2003 | Rao |
| 2006/0136739 A1 | 6/2006 | Brock et al. |
| 2006/0183462 A1 | 8/2006 | Kolehmainen |
| 2007/0190939 A1 | 8/2007 | Abel |
| 2007/0219981 A1 | 9/2007 | Takaai et al. |
| 2009/0327398 A1 | 12/2009 | Campbell et al. |
| 2010/0093278 A1 | 4/2010 | Abel et al. |
| 2010/0217780 A1 | 8/2010 | Erola et al. |
| 2010/0234009 A1 | 9/2010 | Antan et al. |
| 2011/0066895 A1 | 3/2011 | Windell et al. |
| 2011/0090886 A1 | 4/2011 | Park et al. |
| 2011/0001074 A1 | 5/2011 | Ramsdell et al. |
| 2011/0001794 A1 | 7/2011 | Lederer |
| 2012/0265694 A1 | 10/2012 | Tuchman et al. |
| 2013/0097682 A1* | 4/2013 | Zeljkovic .............. H04L 9/3231 726/7 |
| 2013/0018542 A1 | 7/2013 | Chevillat |
| 2013/0185426 A1 | 7/2013 | Chevillat |
| 2013/0031857 A1 | 11/2013 | Prakash et al. |
| 2013/0318576 A1 | 11/2013 | Prakash et al. |
| 2014/0189843 A1 | 7/2014 | Francisco et al. |
| 2014/0282949 A1 | 9/2014 | Nath et al. |
| 2014/0335823 A1 | 11/2014 | Heredia et al. |

* cited by examiner

METHOD AND SYSTEM FOR CONFIGURING A USER EQUIPMENT

CROSS-REFERENCE TO RELATED APPLICATIONS

This application is a Continuation of U.S. patent application Ser. No. 14/418,207 filed on Jan. 29, 2015, which is a 371 of International Application PCT/EP2013/066039, filed Jul. 30, 2013, which claims priority to EP12178527.3, filed on Jul. 30, 2012, all of which are incorporated by reference herein.

The present invention relates to a method for configuring a user equipment.

The present invention further relates to a system for configuring a user equipment.

Although applicable to configuration of a user equipment in general the present invention will be described with regard to a configuration of one or more network connections on a user equipment.

The configuration of a network connection in mobile devices is a tedious process for most users and therefore a high market entry barrier for the subset of users with limited information technology knowledge. Conventional solutions, for example as disclosed in US 2006/0183462 A1, in US 2010/0093278 A1 or in US 2011/0090886 A1 require typing user names and passwords or getting security certificates in advance which can be very inconvenient in terms of user friendliness and/or increase of time required to get access to a network connection to the point of being not useful anymore.

It is therefore an objective of the present invention to provide a method and a system for configuring a user equipment which decreases the level of user interaction required for configuration of a user equipment.

It is a further objective of the present invention to provide a method and a system for configuring a user equipment enabling an easier and faster configuration of the user equipment.

It is an even further objective of the present invention to provide a method and a system which are flexible while providing a lower complexity for a user.

The aforementioned objectives are accomplished by a method and a system.

A method for configuring a user equipment is defined. The method is characterized by the steps of
a) accessing user related information, preferably account information, on the user equipment,
b) transmitting the user related information to a dedicated configuration server,
c) matching the user related information to a specific configuration information,
d) upon matching, transmitting the configuration information to the user equipment,
e) configuring the user equipment with the configuration information,
and wherein initiation of the steps a)-e) is performed by a one-touch-client and
wherein the configuration server is provided as a one-touch-server.

A system for configuring a user equipment, preferably for performing with a method is defined. The system is characterized in that the user equipment is operable to access local user related information, preferably account information, and to transmit the user related information to a dedicated configuration server and that the configuration server is operable to match the user related information to a specific configuration information and upon matching, transmitting the configuration information to the user equipment and wherein the user equipment is operable to be configured with the configuration information.

According to the invention it has been recognized that by exploiting available user related information in the user device, for example a mobile device, an easier and faster configuration of the user equipment is enabled.

According to the invention it has been further recognized that by using a one touch client user satisfactional level is increased in particular by decreasing the level of user interaction required for configuring the user equipment.

According to the invention it has been further recognized that flexibility is ensured.

According to the invention it has been recognized that a fast and reliable as well as easy configuration of the user equipment is enabled.

The matching step c) may be performed by comparing the information provided by the user equipment against a set of information per user required by the configuration server to accept a request.

Further features, advantages and preferred embodiments are described in the following sub-claims.

According to a preferred embodiment a near-field-communication connection between the user equipment and the configuration server for steps b) and/or d) is established. By using a near-field-communication the security is enhanced, since only in a close distance from the user equipment respectively from the configuration server an attacker might be able to listen to the data exchange between the user equipment and the configuration server. Further flexibility is enhanced since near-field-communication enables a pairing of the user equipment and the communication server without explicit authentication of each other.

According to a further preferred embodiment the user related information to be transmitted is pre-configured by a user. This enables enhanced flexibility as well as a fast configuration of the user equipment since the user related information which is to be transmitted to the configuration server may be selected in advance.

According to a further preferred embodiment the configuration information provided by the configuration server include network access configuration information. This reduces the level of user interaction required to configure a network connection based on the network access configuration information. User friendliness is increased and the market entry barrier for users with limited information technology knowledge is lowered.

According to a further preferred embodiment before matching according to step c) the user of the user equipment is authenticated by the configuration server based on the user related information. This enables a "softer" authentication than a conventional authentication performed for instance by a third party entities or based on digital signatures.

According to a further preferred embodiment for performing step e) an explicit acknowledgement by the user has to be performed, preferably by using a one touch gesture on the user equipment. This enhances the flexibility for a user as well as the security, since a user might accept or decline a corresponding configuration of the user equipment based on transmitted configuration information.

According to a further preferred embodiment before configuring according to step e) the transmitted configuration information is presented to the user on the user equipment and if the configuration information comprise a plurality of different separate sub configuration information the user selects one or more of the sub configuration information, preferably by a one-touch to be used for step e). This further enhances the flexibility of a user when configuring by user equipment. The security is enhanced too, since the user may recognize the configuration information before configuring the user equipment. Further by using a one-touch gesture on the user equipment for selecting one or more of the sub configuration information a user may select corresponding information in a very simple way enabling also users with limited technology knowledge to configure the user equipment.

According to a further preferred embodiment for performing step c) available user related information of the user in the internet, preferably accounts of internet services and/or mobile phone numbers are verified against the transmitted user related information. This enables an authentication of a user by the configuration server without requiring an interaction of the user. Therefore the configuration of the user equipment is enabled in a simple way.

According to a further preferred embodiment the transmitted user related information is stored on the configuration server, preferably temporarily for a predefined time period. This further enhances the flexibility, e.g. storing of the transmitted user related information may be performed if a local logging of connection configuration information provided is desired.

According to a further preferred embodiment a communication connection between the user equipment and the configuration server is encrypted. This enhances the security even further when configuring the user equipment with the configuration information.

According to a further preferred embodiment a set of rules for matching according to step c) are pre-defined for each specific configuration information. This enables a configurable set of matching rules. If, for example the set of information provided by the configuration client fulfills the required configurable set of matches defined for a specific network connection configuration, the user identity is considered to be positively authenticated and the request granted.

The configuration server's acceptable set of information required per user may be configured a priori by a corresponding configuration administrator. This can be done per network connection or for all network connection configurations available. This set can comprise in one or the combination of several elements of information provided by the user equipment configuration client and associated relationships. Examples of the set of information for the successful user authentication by matching of information are for instance: 1) user picture, telephone number and address; 2) Google+account identifier matching one inside the configuration server owner "family" circles; 3) LinkedIn account identifier matching the configuration server owner company "x" contacts; 4) user name, email address and phone number matching the configuration server owner customer list stored data; 5) Facebook account identifies matching the configuration server owner "family", "friends", "hobbies", "business" etc. circles.

According to a further preferred embodiment the set of rules for matching is based on a, preferably assigned, unique identifier of the user equipment like MACaddress and/or an IPv6 address. This ensures a reliable matching.

There are several ways how to design and further develop the teaching of the present invention in an advantageous way. To this end, it is to be referred to the patent claims subordinate to patent claim 1 and to the following explanation of preferred examples of embodiments of the invention, illustrated by the figures. In connection with the explanation of the preferred examples of embodiments of the invention by the aid of the figures, generally preferred embodiments and further developments of the teaching will be explained.

Figure 1:
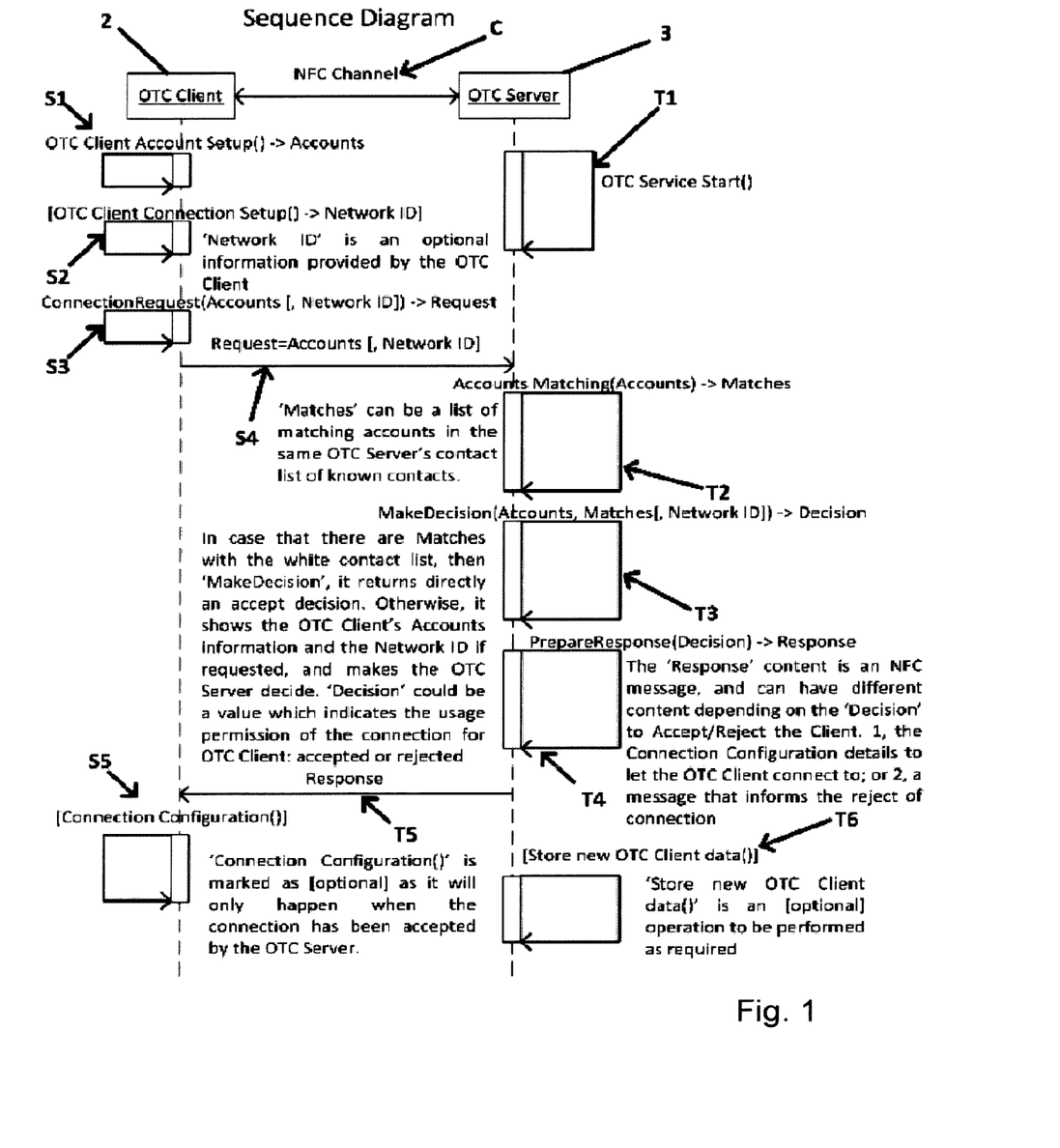
FIG. 1 shows a flow diagram for a method according to a first embodiment of the present invention.

In FIG. 1 a one-touch client respectively OTC client 2 establishes a near-field communication channel C with a one-touch server 3 running on a configuration server 30.

In this preliminary step the one-touch client 2 requests a connection with the one-touch server 3 wherein the one-touch server 3 is able to facilitate this connection information to the one-touch client 2. The one-touch client 2 and the one-touch server 3 then communicate with each other through an near-field communication channel C.

After the preliminary step the one-touch client 2 performs a one-touch client account setup procedure in a first step S1. This one-touch client account setup procedure is performed to get account information for future use by the one-touch client 2.

In a second step S2 the one-touch client 2 may initiate the one-touch client connection setup to determine network ID's. This step S2 is optional and may be performed if the configuration of the user equipment may be performed in several different ways depending on the type or purpose of the user for configuration.

In a third step S3 the one-touch client 2 performs a connection request and in a fourth step S4 the one-touch client 2 transmits the request with the account information and the optional network ID in case the optional one-touch client connection setup procedure (step S2) was performed. Then the one-touch server performs an account matching procedure (step T2): When a near-field communication request is received by the one-touch server 3 the set of information provided in the near-field communication request is compared to a preconfigured set of information required to enable a user to get a specific network connection configuration or a default one. Further it is verified if the transmitted account information belong to verified accounts of internet services, mobile phone numbers or the like. The result of the accounts matching procedure may be list of matching accounts in the same one-touch servers contact list of known contacts.

Prior to this step T2 the one-touch server 3 may initiated by a OTC Service Start procedure in a first step T1 which may be performed upon receiving a connection request or at the start of the OTC server 3.

In a third step T3 the one-touch server 3 performs a Make Decision procedure: Once the set of information provided has been checked and if there is a positive match then the procedure respectively step T3 returns an accept decision and the one-touch server 3 is informed by displaying the set of information received. In case there are (positive) matches these may be regarded as a white contact list, then—during a further configuration—the Make Decision procedure according to step T3 returns directly an accept-decision otherwise it shows the one-touch clients account information and the network ID if requested and makes a one-touch server operator decide. The result of the decision procedure may be a value which indicates the usage permission of the connection(s) for the one-touch client 2, preferably an accept or reject message.

After performing the Make Decision procedure according to step T3 a response is prepared in a fourth step T4: Once the accept or reject decision has been made according to step T3 the one-touch server 3 prepares a corresponding near-field communication response with connection configuration details or a message that indicates the rejection of the connection. Moreover the network configuration information may be customized if a differentiated service provision is desired. This message is sent to the one-touch client 2. Thus the content of the response from the one-touch server 3 to the one-touch client 2 is a near-field communication message which may have different content depending on the result of the Make Decision procedure to accept or reject the client for configuration: The connection configuration details to let the one-touch client 2 connect to or a message that informs the rejection of the connection.

After transmitting the prepared response in a step T5 the one-touch client 2 may perform a connection configuration procedure: If the request was accepted the one-touch client 2 can connect to the desired network with the configuration information received by configuring the user equipment accordingly.

In a sixth step T6 the one-touch server 3 may store the new one-touch client data received in the request according to step S4. The sixth step T6 may be performed if for example a local logging of connection configuration information provided is desired at the one-touch client server 3.

Figure 2:
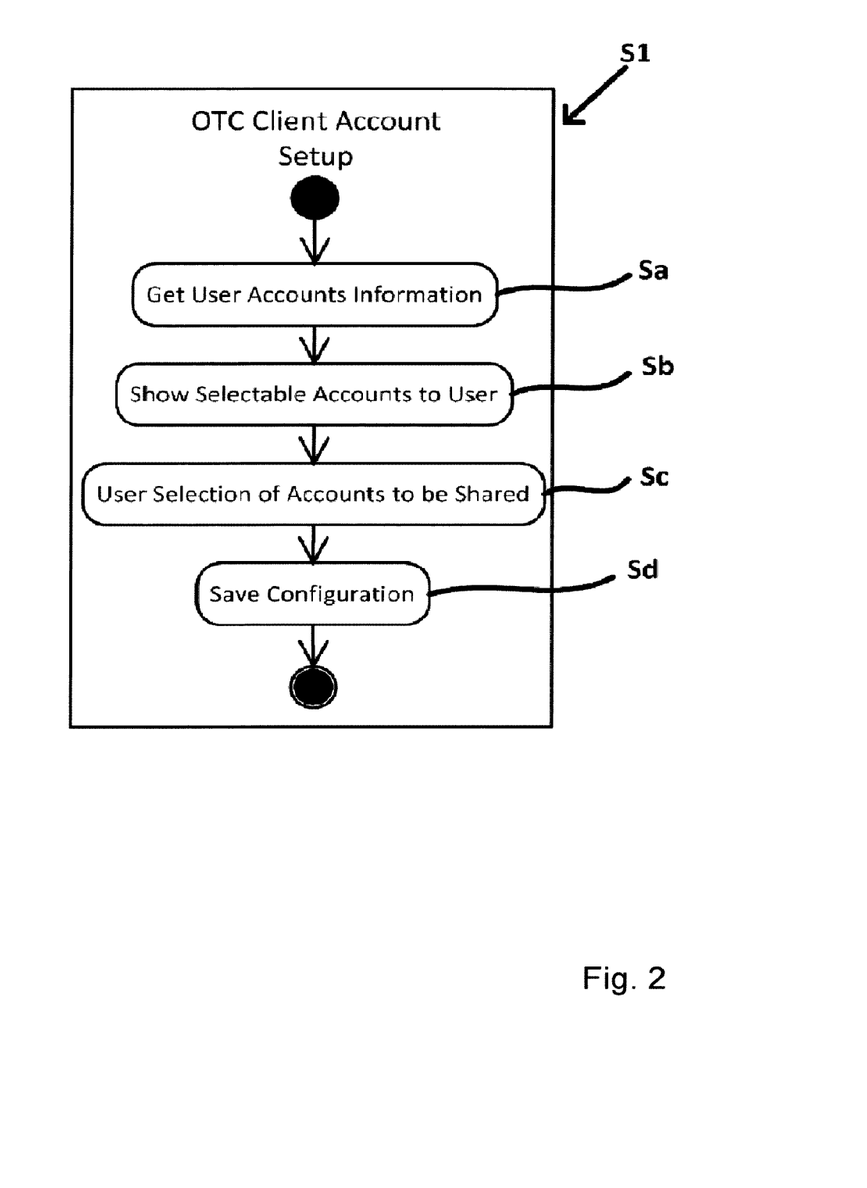
FIG. 2 shows part of a method according to a second embodiment of the present invention.

FIG. 2 shows part of a method according to a second embodiment of the present invention.

In FIG. 2 a one-touch client Account Setup procedure is shown in detail. For example the one-touch client Account Setup procedure may be performed by the following steps: After initiation, in a first step Sa user account information is obtained. In a second step Sb selectable accounts are shown to the user based on the obtained information. User account information may include any available local account information, for example telephone number, E-Mail, internet services accounts, etc.

In a third step Sc the user selects one or more accounts to be shared. Therefore the user has the possibility to select which of these account information shall be shared in order to be recognized by the one-touch server 3. In a fourth step Sd the configuration of the user selected accounts information is saved for future use by the one-touch client 2.

Figure 3:
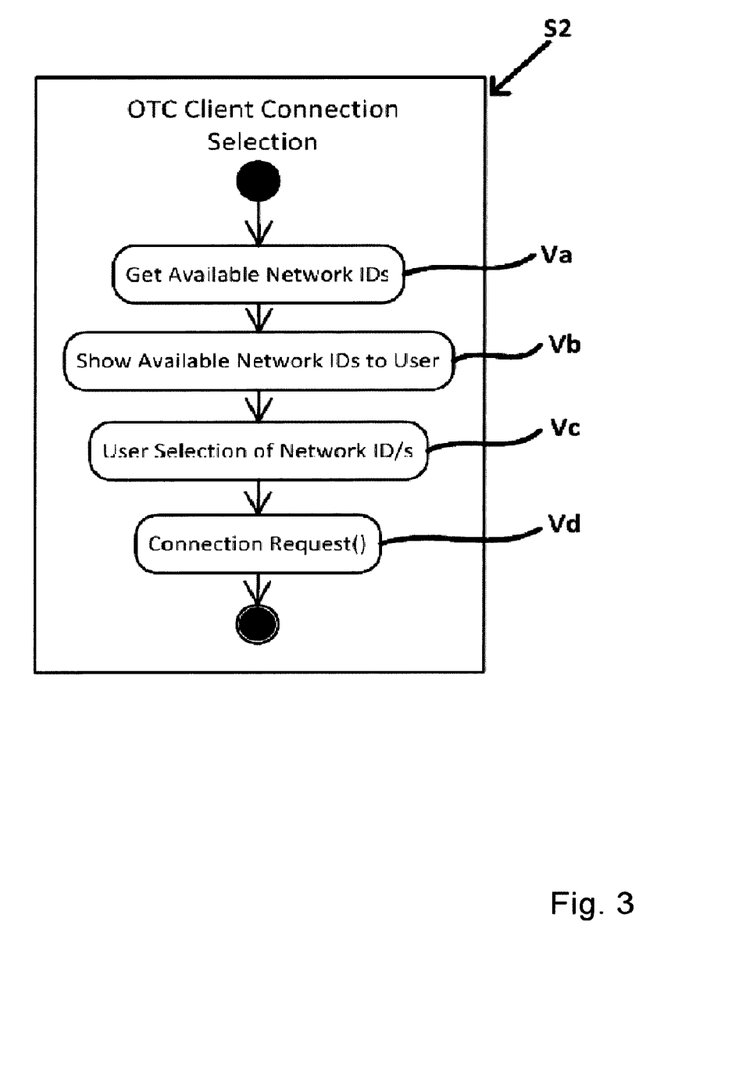
FIG. 3 shows part of a method according to a third embodiment of the present invention.

FIG. 3 shows part of a method according to a third embodiment of the present invention.

In FIG. 3 steps for performing a one-touch client connection Setup Procedure according to the optional step S2 is shown.

In a first step Va available network ID's are obtained, preferably that are in range of the user equipment 1. In a second step Vb the obtained available network ID's are shown to the user.

In a third step Vc the user selects which of these shown network ID's are to be included in a future connection request according to steps S3 and S4. In a fourth step Vd the connection request procedure according to step S3 is initiated.

Figure 4:
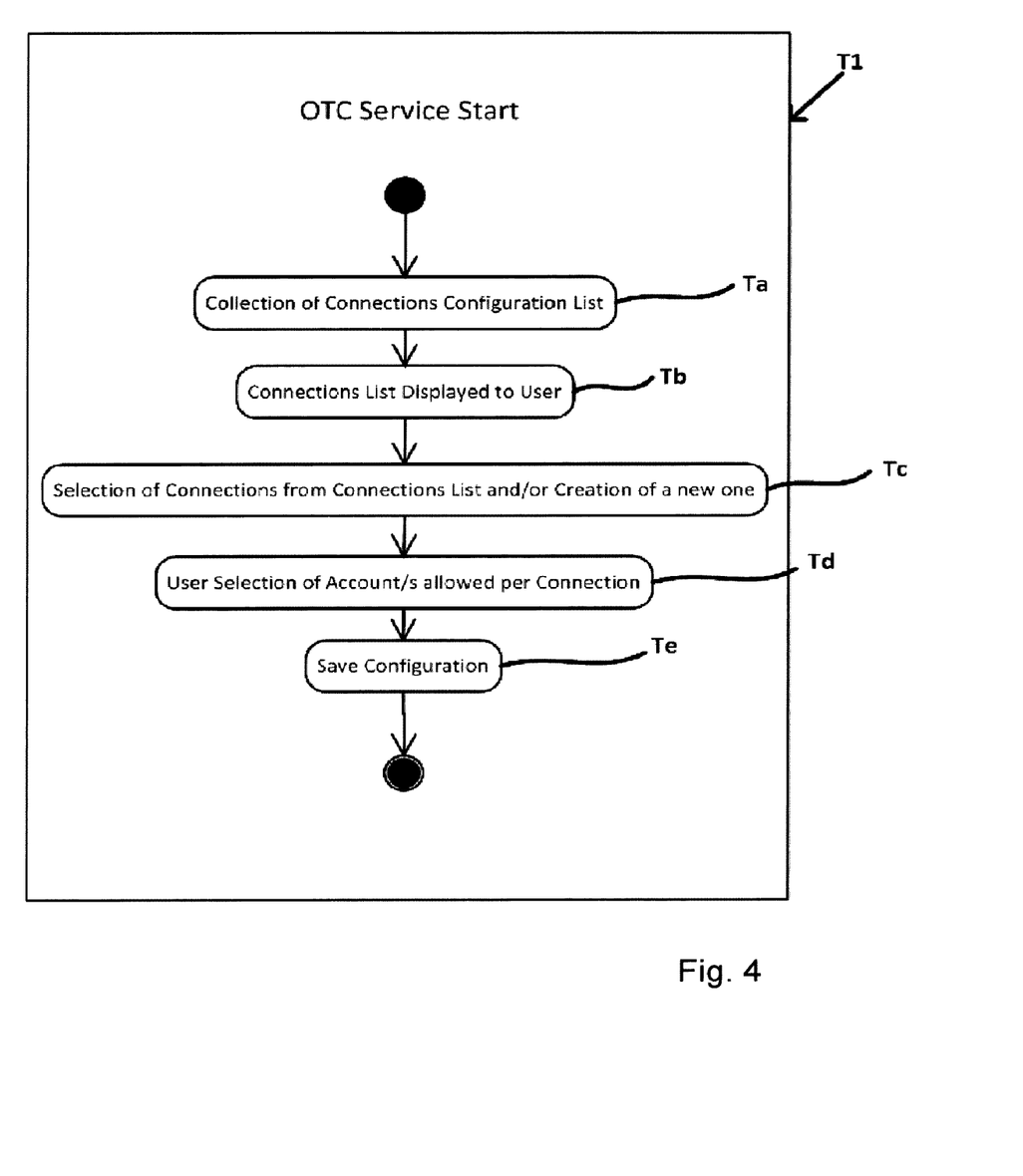
FIG. 4 shows part of a method according to a fourth embodiment of the present invention.

FIG. 4 shows part of a method according to a fourth embodiment of the present invention.

In FIG. 4 a one-touch service Start Procedure for a one-touch server 3 according to step T1 is shown in detail.

On the one-touch server side the one-touch service start procedure needs is performed as a first step T1 for initiation of the one-touch sever 3. The one-touch service start procedure comprises as a first step Ta the step of collecting a list of the connections configuration that the one-touch server 3 is able to provide access to. In a second step Tb the received connections configuration list is displayed to the user.

In a third step Tc the user selects which of the shown connections from the allowed connection list might be requested by an one-touch client 2. Additionally or alternatively the one-touch server 3 may create a new connection itself if applicable. In a fourth step Td the user may filter which accounts are directly allowed to use this connection for the selected connections. For example the selection can be one-by-one, by groups, based on social relationships, all/non, or the like. The selected connections may be seen as a white contact list so that in the future when again the one-touch client 2 contacts the one-touch server 3 for configuring a connection this step may be performed automatically based on the previous white contact list.

In a fifth step Te this configuration is saved. The one-touch service start procedure according to step T1 may be performed preferably before receiving the communication request according to step S4 but it may also performed later then receiving the aforementioned request by the one-touch client 2 allowing to be called on demand.

Figure 5:
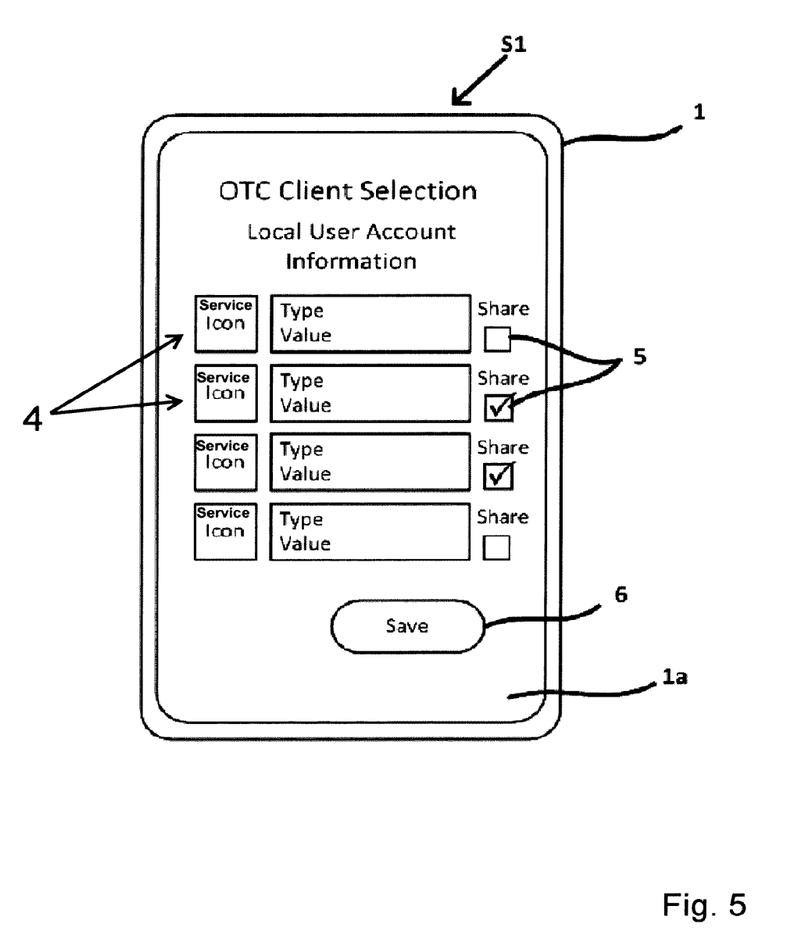
FIG. 5 shows part of a system according to a fifth embodiment of the present invention.

FIG. 5 shows part of a system according to a fifth embodiment of the present invention.

In FIG. 5 a touchscreen 1*a* of user equipment 1 is shown displaying an output of a one-touch client account setup procedure preferably according to step S1 of FIG. 1, where the user may select which set of information he is willing to share for a network connection request. For example the corresponding sets of information 4 is shown together with a share indication field 5 which the user can tip on the touch screen 1*a* of the user equipment 1. After marking the corresponding information the selection may be saved by choosing the save button 6 on the bottom of the display 1*a*.

Figure 6:
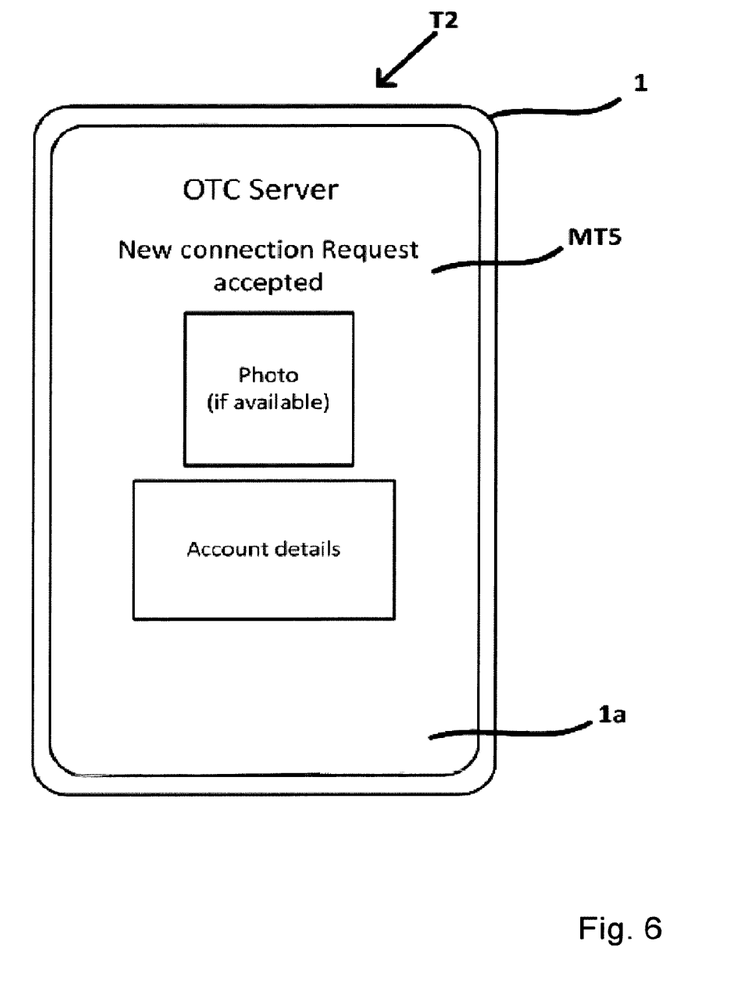
FIG. 6 shows part of a system according to a sixth embodiment of the present invention and FIG. 7 shows part of a system according to a seventh embodiment of the present invention.

FIG. 6 shows part of a system according to a sixth embodiment of the present invention.

In FIG. 6 the one-touch server 3 informing the user equipment 1 of a successful matching based on a near-field communication request is shown when the nearfield communication request was performed automatically. On the touchscreen 1*a* of the user equipment 1 the corresponding accepting message MTS is shown by showing the connection details, a photo if available and the corresponding text for accepting the new connection request, preferably transmitted according to step T2 of FIG. 1

Figure 7:
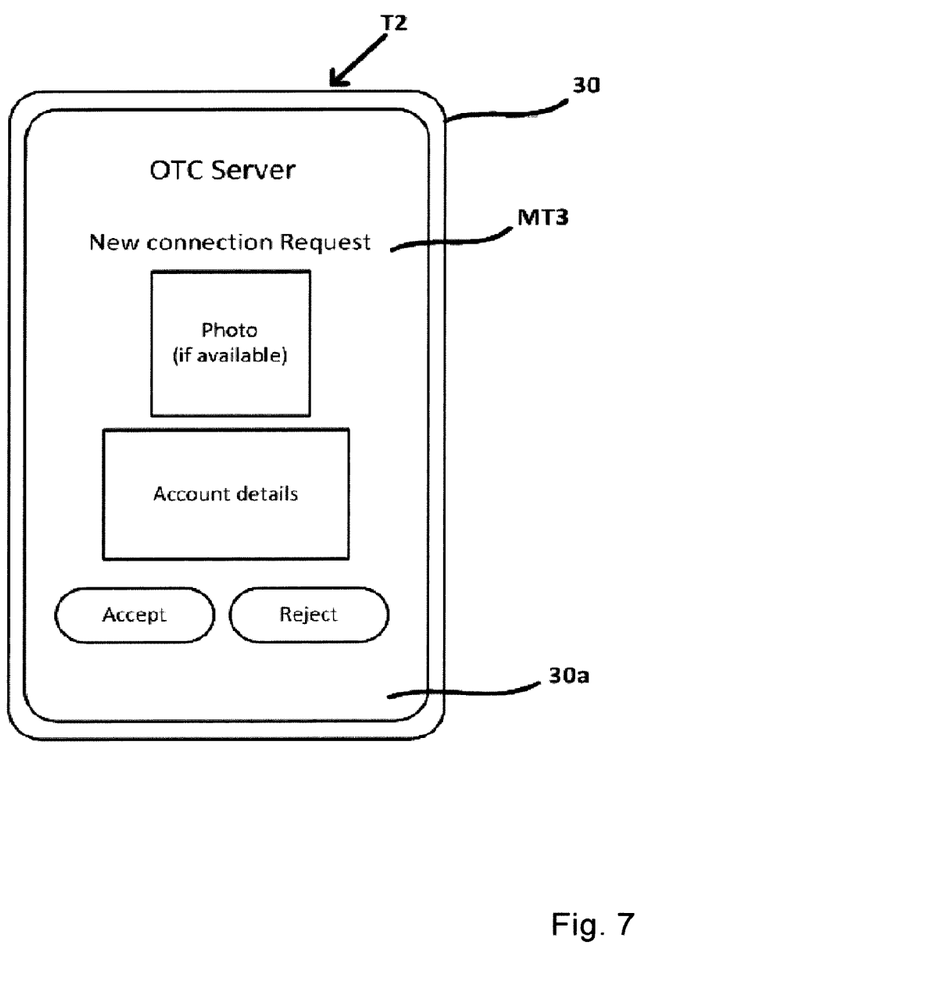

FIG. 7 shows part of a system according to a seventh embodiment of the present invention.

In FIG. 7 the one-touch server menu is shown on a display 30*a* of the one-touch server 30, preferably in step T2 or T3 according to FIG. 1. On the display 30*a* which may be preferably a touch-screen it is shown that a new connection request was received, preferably according to step T2, by the one-touch server 30, a corresponding photo and the corresponding account details for the connection request are also shown. Further accept and reject buttons are shown when an automatic successful matching was not able or was not performed. A user of the one-touch server 30 may then accept or reject the corresponding connection request from the user equipment 1.

In summary the present invention enables a configurable set of available mobile device user information to be used for network connection configuration. The present invention further enables configurable request connections to specific network connection configuration through near-field communication. The present invention further enables an exchange of configured sets of available user information and specific network connection requests and allows an automatic or semi-automatic network connection configuration information provided based on the sets of information received.

The present invention further provides a user connection configuration based on configurable set of available user information. The present invention enables a user-defined configurable exchange of network connection configuration information.

The present invention has inter alia the following advantages: One of the advantages of the present invention is that an easier and faster network connection configuration with increasing user satisfaction is enabled. The present invention provides enhanced flexibility by providing a configurable level of user interaction required for information exchange. The present invention enables an automatic or semi-automatic way to provide network connection configuration information, a faster and lower complexity and a configurable level of security.

Even further the present invention has the advantage enabling user differentiation per connection based on the set of user information provided by the one-touch client and specific network access configuration provided by the one-touch server which can be customized. Of course this is not limited to a configuration of network connections but may be used for configuration of a user equipment in general.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A first user device comprising:
    a touch panel display;
    a memory; and
    a controller comprising at least one processor and computer-readable memory storing program instructions that when executed by the at least one processor, cause the at least one processor to control:
    storing, in the memory, information related to a second user device, configuration information for accessing a network that is within range of the second user device and first network identification information associated with the network;
    receiving, from the second user device, information related to the second user device and network identification information associated with the network; and
    comparing the received information related to the second user device with the stored first information related to the second user device and comparing the received network identification information associated with the network with the stored first network identification information associated with the network;
    wherein when the received information related to the second user device corresponds to the stored first information related to the second user device and the received network identification information associated with the network corresponds with the stored first network identification information associated with the network: displaying on the touch panel information identifying the second user device, the first network identification information associated with the network, a first icon and a second icon,
    wherein after the first icon is touched, configuration information is sent to the second user device, and
    wherein after the second icon is touched, configuration information is not sent to the second user device.

2. The first user device according to claim 1, wherein the stored information related to the second user device includes at least one of a name, email address, telephone number and photo.

3. The first user device according to claim 2, wherein the information identifying the second user device includes at least one of a name, email address, telephone number and photo.

4. The first user device according to claim 1, wherein the configuration information includes a network password.

5. A configuration system comprising:
    a first user device; and
    a second user device;
    wherein said first user device comprises:
        a touch panel display;
        a memory; and
        a controller comprising at least one processor and computer-readable memory storing program instructions that when executed by the at least one processor, cause the at least one processor to control:
        storing, in the memory, information related to the second user device, configuration information for accessing a network that is within range of the second user device and first network identification information associated with the network;
        receiving, from the second user device, information related to the second user device and network identification information associated with the network; and
        comparing the received information related to the second user device with the stored first information related to the second user device and comparing the received network identification information associated with the network with the stored first network identification information associated with the network;
        wherein when the received information related to the second user device corresponds to the stored first information related to the second user device and the received network identification information associated with the network corresponds with the stored first network identification information associated with the network: displaying on the touch panel information identifying the second user device, the first network identification information associated with the network, a first icon and a second icon,
        wherein after the first icon is touched, configuration information is sent to the second user device, and
        wherein after the second icon is touched, configuration information is not sent to the second user device.

6. The configuration system device according to claim 5, wherein the stored information related to the second user device includes at least one of a name, email address, telephone number and photo.

7. The configuration system according to claim 6, wherein the information identifying the second user device includes at least one of a name, email address, telephone number and photo.

8. The configuration system according to claim 5, wherein the configuration information includes a network password.

9. A configuration method comprising:
storing, in a first user device memory, information related to a second user device, configuration information for accessing a network that is within range of the second user device and first network identification information associated with the network;
receiving, from the second user device, information related to the second user device and network identification information associated with the network; and
comparing the received information related to the second user device with the stored first information related to the second user device and comparing the received network identification information associated with the network with the stored first network identification information associated with the network;
wherein when the received information related to the second user device corresponds to the stored first information related to the second user device and the received network identification information associated with the network corresponds with the stored first network identification information associated with the network: displaying on a touch panel on the first user device information identifying the second user device, the first network identification information associated with the network, a first icon and a second icon,
wherein after the first icon is touched, configuration information is sent to the second user device, and
wherein after the second icon is touched, configuration information is not sent to the second user device.

10. The method according to claim 9, wherein the stored information related to the second user device includes at least one of a name, email address, telephone number and photo.

11. The method according to claim 10, wherein the information identifying the second user device includes at least one of a name, email address, telephone number and photo.

12. The method according to claim 9, wherein the configuration information includes a network password.

* * * * *